(12) United States Patent
Kaiser et al.

(10) Patent No.: US 11,105,381 B2
(45) Date of Patent: Aug. 31, 2021

(54) ROTOR ASSEMBLY BEARING WITH CENTRIFUGAL CLUTCH MECHANISM

(71) Applicant: AKTIEBOLAGET SKF, Gothenburg (SE)

(72) Inventors: Mike F. Kaiser, Southlake, TX (US); Warren A. Lange, Sycamore, IL (US); Patrick McInerney, Geneva, IL (US); Daniel L. Riedl, Marengo, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/781,092

(22) Filed: Feb. 4, 2020

(65) Prior Publication Data

US 2021/0239165 A1 Aug. 5, 2021

(51) Int. Cl.
*F16C 27/06* (2006.01)
*F16C 33/22* (2006.01)
(Continued)

(52) U.S. Cl.
CPC .............. *F16D 23/14* (2013.01); *F16C 27/06* (2013.01); *F16C 27/063* (2013.01); *F16C 33/22* (2013.01);
(Continued)

(58) Field of Classification Search
CPC ...... F16C 23/043; F16C 23/045; F16C 27/06; F16C 27/063; F16C 33/22; F16C 35/00;
(Continued)

(56) References Cited

U.S. PATENT DOCUMENTS 3,228,673 A * 1/1966 Hinks ..................... F16C 33/24
267/282
3,511,492 A * 5/1970 Galbato ................ F16C 27/063
267/152
(Continued)

FOREIGN PATENT DOCUMENTS

CN 100357626 C * 12/2007 ........... F16D 41/066
CN 103503284 A * 1/2014 ............. H02K 7/083
(Continued)

*Primary Examiner* — Marcus Charles
(74) *Attorney, Agent, or Firm* — J-TEK Law PLLC; Scott T. Wakeman; Mark A. Ussai

(57) ABSTRACT

A bearing assembly is for movably coupling a first member having a centerline and displaceable about a rotation axis perpendicular to the centerline and a second member displaceable about the centerline and/or another axis perpendicular to the centerline. The bearing assembly includes a laminated bearing having an inner axial end coupled with the second member and an outer axial end spaced from the inner end along the first member centerline and coupleable with the first member. A clutch mechanism releasably couples the bearing outer axial end with the first member when the first member angularly displaces about the rotation axis. The clutch mechanism preferably has a first portion connected with the bearing outer axial end, a second portion coupled with the first member and engageable with the first portion to couple the two members, and a biasing member spaces apart the two clutch portions when the first member is non-rotational.

20 Claims, 5 Drawing Sheets

(51) Int. Cl.
*F16C 35/00* (2006.01)
*F16D 23/14* (2006.01)
*F16F 3/093* (2006.01)
*F16F 1/12* (2006.01)
*F16D 23/06* (2006.01)

(52) U.S. Cl.
CPC ............. *F16C 35/00* (2013.01); *F16F 1/127* (2013.01); *F16F 3/093* (2013.01); *F16D 2023/0656* (2013.01)

(58) Field of Classification Search
CPC ...... F16F 1/27; F16F 1/40; F16F 3/093; F16F 1/127; B64C 27/00; F16D 2023/0656; F16D 23/14
USPC ........ 384/221–222; 416/134 R; 267/81, 248, 267/294
See application file for complete search history.

(56) References Cited

U.S. PATENT DOCUMENTS

| | | | | |
|---|---|---|---|---|
| 3,759,632 A * | 9/1973 | Rybicki | ................ | B64C 27/35 416/134 R |
| 3,799,637 A * | 3/1974 | McCullough | ........... | F16C 33/24 384/125 |
| 4,040,690 A * | 8/1977 | Finney | ................... | B64C 27/48 384/221 |
| 4,232,563 A * | 11/1980 | Peterson | ................. | B64C 27/32 248/635 |
| 4,341,499 A * | 7/1982 | Peterson | ................. | B64C 27/35 416/134 A |
| 4,588,356 A * | 5/1986 | Pariani | ................. | B64C 27/322 416/107 |
| 5,092,738 A * | 3/1992 | Byrnes | .................... | B64C 27/51 416/134 A |
| 5,248,361 A * | 9/1993 | Paquet | .................... | B32B 25/10 156/171 |
| 5,601,408 A * | 2/1997 | Hunter | .................... | B64C 27/35 267/141.1 |
| 9,334,048 B2 * | 5/2016 | Burnett | ................ | F16C 27/063 |
| 9,896,198 B2 * | 2/2018 | Davis | ...................... | B64C 27/32 |
| 2016/0091017 A1 * | 3/2016 | Mueller | ................ | F16F 1/3876 384/125 |
| 2016/0238068 A1 * | 8/2016 | Bohm | ................... | F16C 23/045 |
| 2016/0238069 A1 * | 8/2016 | Bohm | ................... | F16C 23/045 |
| 2019/0032741 A1 * | 1/2019 | George | ................ | F16F 1/403 |

FOREIGN PATENT DOCUMENTS

| | | | | |
|---|---|---|---|---|
| DE | 3139335 C2 * | 4/1990 | ................ | F16F 1/40 |
| EP | 0187265 A2 * | 7/1986 | ............. | F16F 1/371 |
| EP | 3052380 B1 * | 11/2019 | ................ | F16F 1/40 |
| JP | H04228939 A * | 8/1992 | ................ | F16F 9/12 |
| JP | 2009243573 A * | 10/2009 | ................ | F16C 1/40 |
| KR | 20140018283 A * | 2/2014 | ................ | F16F 1/41 |

* cited by examiner

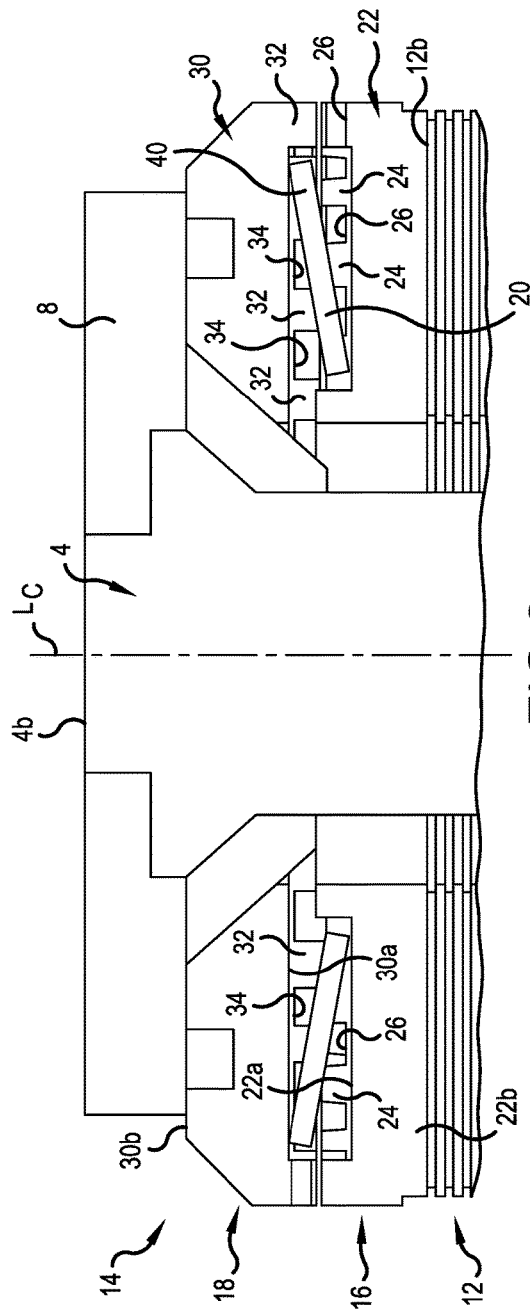
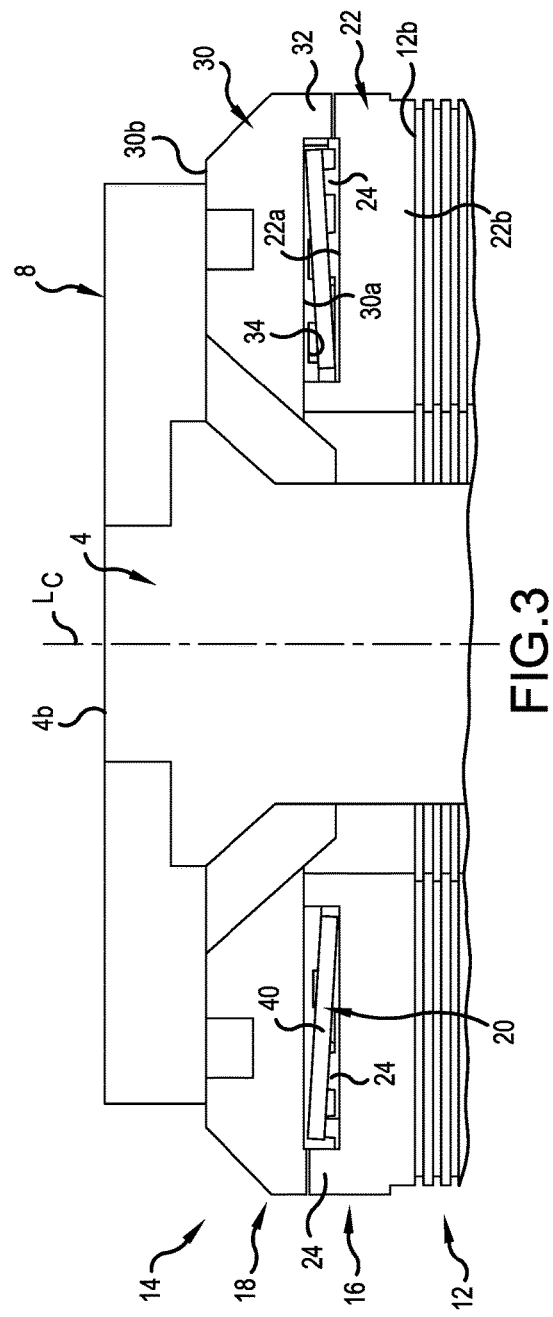

ROTOR ASSEMBLY BEARING WITH CENTRIFUGAL CLUTCH MECHANISM

BACKGROUND OF THE INVENTION

The present invention relates to bearings, and more particularly to laminated bearings for rotorcraft.

Laminated bearings are known and are formed of a plurality of alternating flexible laminae, typically formed of an elastomeric material, and rigid laminae, usually formed of a metallic material. Such bearings are particularly suitable for transmitting oscillatory motions of relatively lesser angular displacement as larger angular displacements may damage the elastomeric layers and/or cause the elastomeric layers to become permanently strained or "take a set". Particularly with helicopter rotor applications, the largest torsional forces are generally applied when the rotor blades are adjusted during non-flight conditions. In order to prevent damage to the laminated bearings used to support the rotor blades, the bearings are often made diametrically larger to reduce the strain experienced by the elastomeric layers for a given torsional load.

SUMMARY OF THE INVENTION

In one aspect, the present invention is a bearing assembly for movably coupling first and second members. The first member has a centerline and is angularly displaceable about a rotation axis at least generally perpendicular to the centerline and the second member is angularly displaceable about the centerline and/or another axis perpendicular to the centerline. The bearing assembly comprises a laminated bearing with a central bore for receiving a portion of the first member and having an inner axial end coupled with the second member and an outer axial end spaced from the inner axial end along the first member centerline and being coupleable with the first member. A clutch mechanism is configured to releasably couple the bearing outer axial end with the first member when the first member angularly displaces about the rotation axis.

In another aspect, the present invention is a rotor assembly for a rotorcraft, the rotor assembly comprising a mast rotatable about a central axis, a spindle having an inner radial end coupled with the mast, an opposing outer radial end and a centerline extending between the inner and outer ends and an elongated rotor blade extending perpendicular to the central axis. A bearing assembly movably couples the blade with the spindle and includes a laminated bearing with a central bore for receiving a portion of the spindle and having an inner axial end coupled with the blade and an outer axial end spaced from the inner axial end along the spindle centerline and being coupleable with the spindle. Further, a clutch mechanism is configured to releasably couple the outer axial end of the bearing with the spindle when the spindle angularly displaces about the mast central axis.

In a further aspect, the present invention is again a bearing assembly for movably coupling first and second members, the first member having a centerline and being angularly displaceable about a rotation axis at least generally perpendicular to the centerline and the second member being angularly displaceable about the centerline and/or another axis perpendicular to the centerline. The bearing assembly comprises a laminated bearing with a central bore for receiving a portion of the first member and having an inner axial end coupled with the second member and an outer axial end spaced from the inner axial end along the first member centerline and being coupleable with the first member. A clutch mechanism has a first portion connected with the outer axial end of the laminated bearing and a second portion coupled with the first member, the clutch first and second portions being engageable to releasably couple the second member with the first member. Further, a biasing member is configured to space apart the first and second clutch portions when the first member is non-rotational about the rotation axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 2 is an enlarged, broken-away view of a portion of FIG. 1, showing a clutch mechanism is a first, non-engaged configuration;

FIG. 3 is another view of the clutch mechanism of FIG. 2, showing the clutch mechanism in a second, engaged configuration;

DETAILED DESCRIPTION OF THE INVENTION

Figure 1:
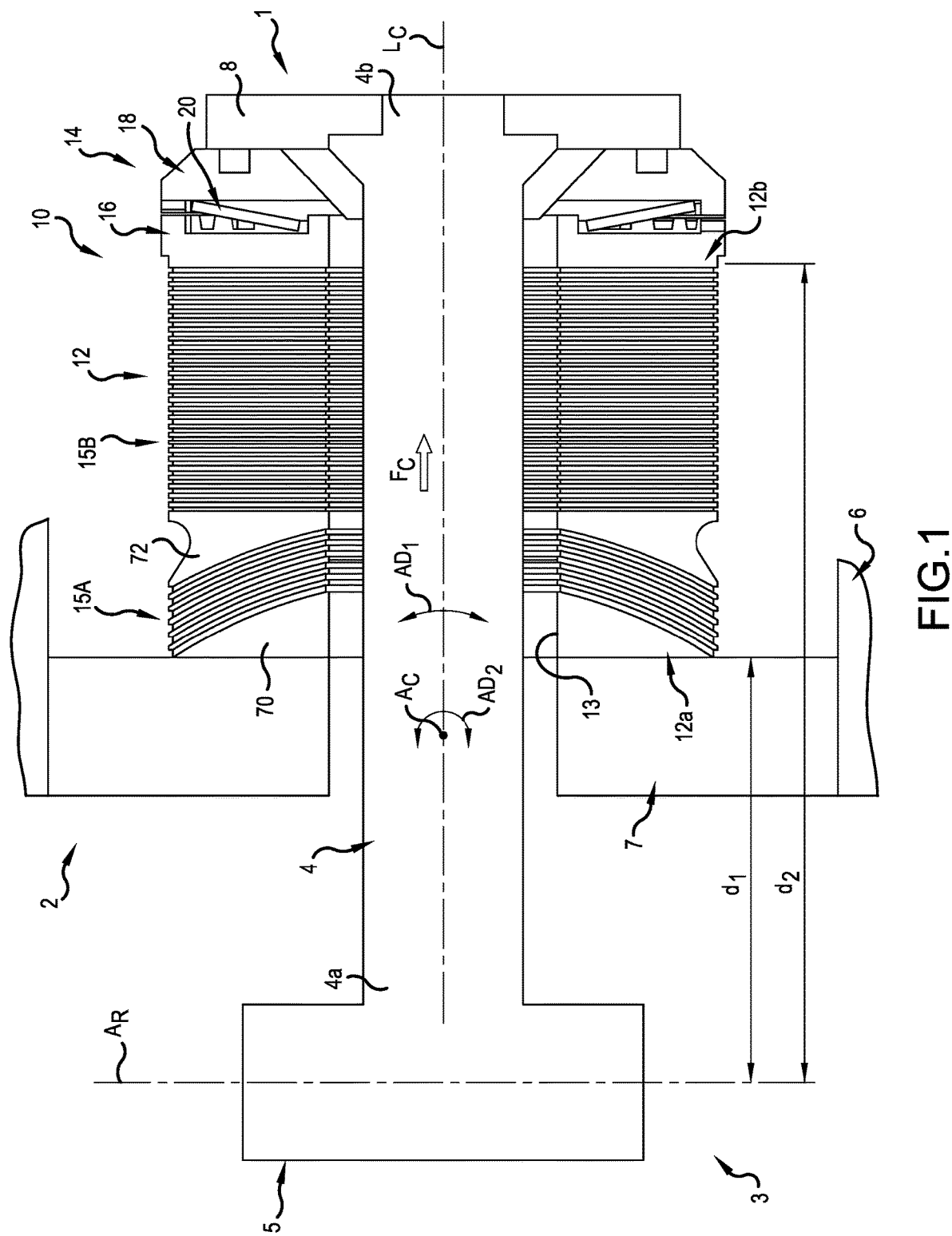
FIG. 1 is an axial cross-sectional view through a rotor assembly of a rotorcraft including a bearing assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-6 a bearing assembly 10 for movably coupling first and second members 1, 2, respectively, of a rotor assembly 3. The first member 1 is preferably a spindle 4 having an inner radial end 4a connected with a yoke or mast 5 of the rotor assembly 3, an opposing outer end 4b and a centerline $L_C$ extending between the inner and outer ends 4a, 4b, respectively. The spindle 4 is angularly displaceable about a rotation axis $A_R$ through the yoke/mast 5, i.e., by rotation of the mast 5 about the central axis $A_R$, which is at least generally perpendicular to the centerline $L_C$. The second member 2 is preferably an elongated rotor blade 6 extending at least generally perpendicular to the central axis $A_C$ and including an inner beam 7 disposed about the spindle 4 to couple the main portion of the blade 6 thereto. The second member/blade 2 is angularly displaceable about at least the spindle centerline $L_C$, to enable adjustment of the blade pitch, and is preferably also angularly displaceable about another axis $A_C$ (FIG. 1) perpendicular to the centerline $L_C$, in order to permit cocking of the blade 6. However, the first and second members 1, 2 may alternatively be any other appropriate components of a rotor assembly, or of any other mechanical assembly, in which one member is angularly displaceable about at least a centerline of the other member and preferably also an axis perpendicular to the centerline, such as for example, a brake assembly or a transmission.

The bearing assembly 10 basically comprises a laminated bearing 12 disposed about the first member/spindle 1 and a centrifugal clutch mechanism 14 for releasably coupling the second member/blade 2 with the first member 1, i.e., through the bearing 12. The laminated bearing 12 is generally cylindrical and has a central bore 13 for receiving a portion of the first member 1, such that the bearing 12 is movably disposed about the member 1. The bearing 12 has an inner axial end 12a coupled with the second member 2 and an outer axial end 12b spaced from the inner axial end 12a along the centerline $L_C$ and is coupleable with the first member 1. Specifically, the terms "inner" and "outer" with regard to the two bearing ends 12a, 12b mean that the laminated bearing 12 is arranged such that the bearing inner axial end 12a is located a first radial distance $d_1$ from the rotation axis $A_R$ and the bearing outer axial end 12b is located a second, greater radial distance $d_2$ from the rotation axis $A_R$, such that the inner end 12a is radially inward of the outer end 12b, and vice versa, as indicated in FIG. 1. The clutch mechanism 14 is configured to releasably couple the outer axial end 12b of the bearing 12 with the first member 1 when the first member 1 angularly displaces about the rotation axis $A_R$, preferably when a value of the rotational speed of the first member 1 about the rotation axis $A_R$ is at least a predetermined value, such as for example, a value within a range of about four hundred rotations per minute (400 rpm) and eight hundred rotations per minute (800 rpm). The clutch mechanism 14 is also configured to alternatively decouple the bearing 12 from the first member 1 when the rotational speed of the first member 1 is lesser than or below the predetermined value, such as when the spindle 4 is not rotating or "non-rotational" about the axis $A_R$.

With the laminated bearing 12 coupled with the first member 1, the bearing inner end 12a is angularly displaceable about the centerline $L_C$ with respect to the bearing outer end 12b when the second member 2 angularly displaces about the centerline $L_C$, for example, during pitch adjustment or "feathering" of the rotor blade 6, as indicated by arrow $AD_1$ in FIG. 1. Also, at least a portion of the laminated bearing 12 is deflectable about the other or "cocking" axis $A_C$ when the second member 2 angularly displaces or bends about the cocking axis $A_C$, as indicated by arrow $AD_2$ in FIG. 1. Further, the clutch mechanism 14 functions to prevent potential damage to the elastomeric portions of the laminated bearing 12, as described below, which may occur when the blade pitch angle is adjusted, i.e., angular displacement of the blade 6 about the spindle centerline $L_C$, during non-operational states of the rotorcraft. That is, when the clutch mechanism 14 is disengaged as described below, the entire bearing 12 angularly displaces about the centerline $L_C$ along with the second member 2, without any relative displacement between the flexible layers of the laminated bearing 12. Thus, the clutch mechanism 14 enables relative angular displacement between the first and second members 1, 2 without any loading on the laminated bearing 12, thereby preventing permanent setting of or other damage to the elastomeric portions of the bearing 12.

Referring now to FIGS. 1-5, the clutch mechanism 14 is actuated by centrifugal force, as discussed below, and preferably includes a first portion 16 connected with the outer axial end 12b of the laminated bearing 12 and a second portion 18 coupled with the first member 1. The clutch first and second portions 16, 18 are engageable to releasably couple the bearing 12 with the first member 1, and thereby the second member 2 with the first member 1. Further, a biasing member 20 is configured to space apart the first and second clutch portions 16, 18 when the first member 1 is non-rotational about the rotation axis $A_R$, i.e., when the spindle 4 is angularly fixed or not rotating about the axis $A_R$. More specifically, the biasing member 20 retains the clutch portions 16, 18 spaced apart while the rotational speed of the first member 1 about the rotation axis $A_R$ remains below the predetermined value (as discussed above), as shown in FIG. 2. Further, due to the laminated bearing 12 being movably disposed about the first member 1, centrifugal force $F_C$ (indicated in FIG. 1) generated during rotation of the first member 1 displaces the bearing 12 and the first clutch portion 16 radially outwardly along the first member centerline $L_C$ and deflects the biasing member 20, such that the clutch first portion 16 engages with the clutch second portion 18 as depicted in FIG. 3, preferably when the rotational speed of the first member 1 about the axis $A_R$ is at least the predetermined value.

Figure 4:
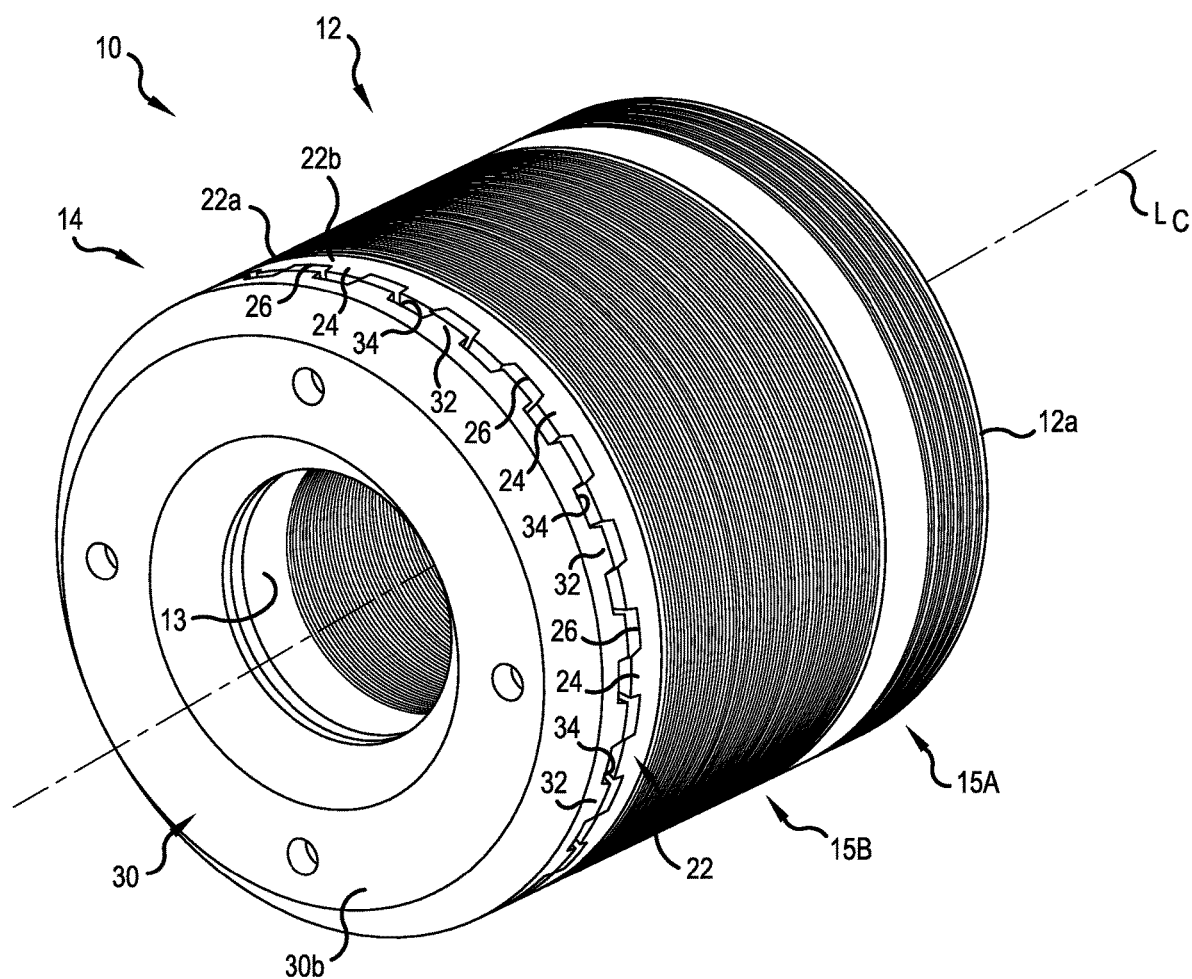
FIG. 4 is a perspective view of the bearing assembly of the present invention.

Referring to FIGS. 2-4, the clutch first portion 16 preferably includes an annular body 22 having first and second axial ends 22a, 22b, respectively, the second end 22b being connected with, and preferably integrally formed with, the outer end 12b of the bearing 12, and a plurality of teeth 24 extending axially from the first end 22a. The teeth 24 are spaced circumferentially about the centerline $L_C$ so as to define a separate one of a plurality of recesses 26 between each pair of adjacent teeth 24. Similarly, the clutch second portion 18 preferably includes an annular body 30 having first and second axial ends 30a, 30b, respectively, the second end 30b being connected with the first member 1, preferably by attachment to an annular endplate 8 on the spindle outer end 4b. A plurality of teeth 32 extend axially from the body first end 30a and are spaced circumferentially about the centerline $L_C$ so as to define a separate one of a plurality of recesses 34 between each pair of adjacent teeth 32.

Further, each one of the clutch first portion teeth 24 is disposable within a separate one of the clutch second portion recesses 34 and each one of the second portion teeth 32 is disposable within a separate one of the first portion recesses 26 when the clutch first and second portions 16, 18, respectively, are engaged. Thereby, the engagement of the two clutch portions 16, 18 couples the second member 2/blade 6 with the first member 1/spindle 4, through the laminated bearing 12, such that torsional forces generated by angular displacement of the second member 2 are transmitted to the first member 1.

Furthermore, the biasing member 20 preferably includes a disk spring 40 disposed between the clutch first and second portions 16, 18. The disk spring 40 is configured to bias each one of the clutch first and second portions 16, 18 away from the other one of the clutch first and second portions 16, 18 when the first member 1 is non-rotational about the rotation axis $A_R$, and preferably whenever the first member rotational speed is below the predetermined value. However, when the rotational speed is at least the predetermined value, centrifugal force $F_C$ exerted on the bearing assembly 10 causes the laminated bearing 12 and the clutch first portion 16 to displace radially outwardly along the centerline $L_C$ and deflect or "collapse" the disk spring 40, thereby permitting engagement of the two clutch portions 16, 18.

Although the clutch mechanism 14 preferably includes two annular portions 16, 18 with axially-extending, engageable teeth 24, 32 and a biasing member 20 as described above, the clutch mechanism 14 may be formed in any appropriate manner that enables engagement of the mechanism 14 when the first member 1/spindle 4 is rotating about the central axis $A_R$ and disengagement of the mechanism 14 when the first member 1 is stationary or non-rotational. For example, the biasing member 20 may be a wave spring, a coil spring, a solid compressible cylinder or any other type of biasing device capable of separating the two clutch portions 16, 18 below a certain rotational speed and collapsible or deflectable by centrifugal force to enable clutch engagement (no alternatives shown). Further for example, a first clutch portion may have an annular body with teeth extending radially-outwardly from an outer circumferential surface and a second clutch portion may have an annular body disposable about the first clutch portion body and having complementary teeth extending radially inwardly from an inner circumferential surface (structure not shown). As yet another example, the two clutch portions may be generally frustoconical and have engaging teeth or splines that extend both radially and axially or have complementary frictionally engageable surfaces (not depicted). The scope of the present invention encompasses these and any other structures of a clutch mechanism capable of coupling the laminated bearing 12 with the first member 1 when the first member 1 begins to rotate and to alternatively disengage the bearing 12 from the first member 1 when the first member 1 is fixed or non-rotational about the central axis $A_R$.

Figure 5:
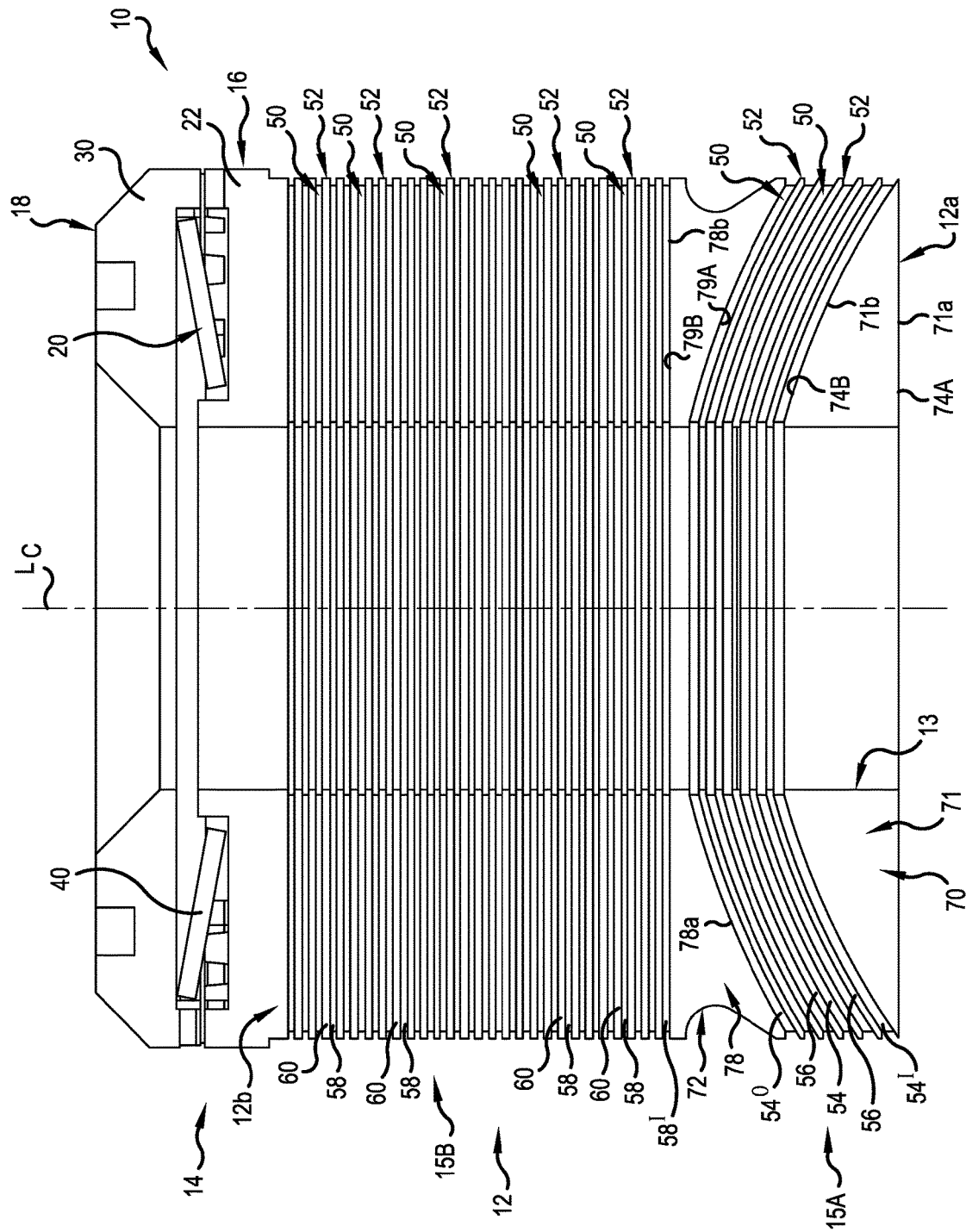
FIG. 5 is an axial cross-sectional view of the bearing assembly of the present invention.
Figure 6:
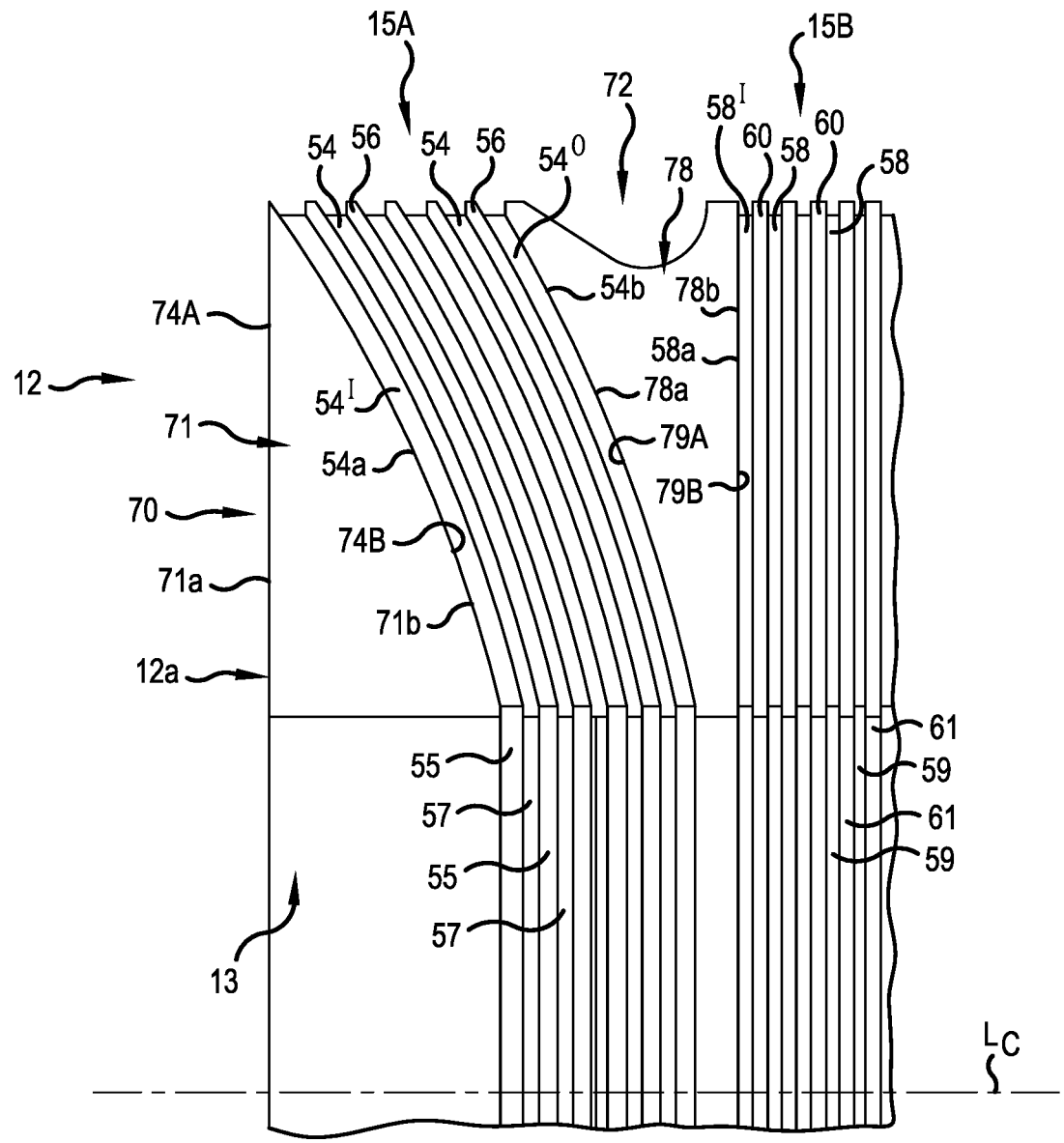
FIG. 6 is an enlarged, broken-away view of a portion of FIG. 5.

Referring to FIGS. 5 and 6, the laminated bearing 12 includes a plurality of alternating flexible laminae 50 and rigid laminae 52 bonded together and spaced along the first member centerline $L_C$. The laminated bearing 12 is configured such that each one of the flexible laminae 50 torsionally deforms to angularly displace the bearing inner end 12a with respect to the bearing outer end 12b when the second member 2 angularly displaces about the first member centerline $L_C$. That is, when the clutch mechanism 14 couples the bearing 12 with the first member 1 such that torque is transmissible from the second member 2 to the first member 1, each flexible lamina 50 angularly deflects or deforms, carrying the bonded rigid laminae 52, during angular displacement of the second member 2 about the centerline $L_C$. As such, the bearing inner end 12a is angularly displaced relative to the bearing outer end 12b (fixed with respect to the centerline $L_C$) by the total or collective displacements of all the individual flexible laminae 50.

Preferably, the laminated bearing 12 includes a first, radially inner portion 15A for supporting angular displacement or "cocking" about the axis $A_C$ and a second, radially outer portion 15B for primarily supporting angular displacement about the centerline $L_C$. In the bearing first portion 15A, each flexible lamina 50 is formed as a partially spherical layer 54 of elastomeric material with a central opening 55 and each rigid lamina 52 includes a partially spherical rigid shell 56, preferably formed of a metallic material, including a central opening 57, the openings 55 and 57 collectively forming a portion of the central bore 13. The bearing first, radially inner portion 15A is configured to deflect about the cocking axis $A_C$ when the second member 2 angularly displaces about the axis $A_C$.

With the bearing second, cylindrical radially outer portion 15B, each one of the flexible laminae 50 includes a flat layer 58 of an elastomeric material with a central opening 59 and each one of the rigid laminae 52 is formed as a flat annular plate 60, preferably formed of a metallic material, with a central opening 61, the openings 59 and 61 collectively forming the majority of the bearing bore 13. Although both bearing portions 15A, 15B support angular displacement about the spindle centerline $L_C$, the bearing second portion 15B is sized to support the majority of the torsional loading generated by displacement of the second member/blade 2.

Still referring to FIGS. 5 and 6, the bearing assembly 10 preferably further comprises an inner member 70 providing the bearing inner end 12a and a transition member 72 disposed between and connecting the bearing first and second portions 15A, 15B. The inner member 70 is formed as a partially spherical, solid body 71 having an inner axial end 71a with a flat radial surface 74A connected with the second member 2 or blade 6, preferably through the beam 7 attached to an inner end of the rotor blade 6, and an outer axial end 71b with a partially spherical convex surface 74B. A concave surface 54a of the innermost flexible lamina 54$^I$ of the bearing first portion 15A is bonded to the convex spherical surface 74B of the inner member 70.

Further, the transition member or "shim" 72 is formed as a generally cylindrical body 78 having an inner axial end 78a with a partially spherical concave surface 79A and an outer axial end 78b with a flat radial surface 79B. With this structure, a convex surface 54b of the outermost flexible lamina 54$^O$ of the first bearing portion 15A is bonded to the transition member concave surface 79A and a flat radial surface 58a of an innermost flexible lamina 58$^I$ of the bearing second portion 15B is bonded to transition member flat radial surface 79B.

The bearing assembly 10 of the present invention is clearly advantageous over previously known bearing assemblies used to couple rotor blades with a rotor assembly. The clutch mechanism 14 enables the laminated bearing 12 to be decoupled from the first member 1 or spindle 4 when the rotorcraft is not in flight, such that any high torque adjustment of the second member 2 or blade 6 merely results in the laminated bearing 12 angularly displacing about the spindle centerline $L_C$ without any strain on the elastomeric portions of the bearing 12. And when the rotorcraft begins flight operation by rotating or "spinning" the rotor blades 6, centrifugal force $F_C$ generated by the rotating spindle 4 automatically engages (i.e., without any further action) the laminated bearing 12 with the spindle 4 and thereby couples the blade 6 with the spindle 4.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A bearing assembly for movably coupling a first member and a second member, the first member having a centerline and being angularly displaceable about a rotation axis at least generally perpendicular to the centerline, the second member being angularly displaceable about at least one of the centerline and another axis perpendicular to the centerline, the bearing assembly comprising:

a laminated bearing with a central bore for receiving a portion of the first member and having an inner axial end coupled with the second member and an outer axial end spaced from the inner axial end along the first member centerline and being coupleable with the first member; and a clutch mechanism configured to releasably couple the bearing outer axial end with the first member when the first member angularly displaces about the rotation axis.

2. The bearing assembly as recited in claim 1 wherein the clutch mechanism is configured to couple the bearing outer end with the first member when a value of the rotational speed of the first member about the rotation axis is at least a predetermined value.

3. The bearing assembly as recited in claim 1 wherein the clutch mechanism includes a first portion connected with the outer axial end of the laminated bearing, a second portion coupled with the first member, the clutch first and second portions being engageable to releasably couple the second member with the first member, and a biasing member configured to space apart the first and second clutch portions when the first member is non-rotational about the rotation axis.

4. The bearing assembly as recited in claim 3 wherein the laminated bearing is movably disposed about the first member such that centrifugal force displaces the bearing and the first clutch portion radially outwardly along the first member centerline and deflects the biasing member so that the clutch first portion engages with the clutch second portion when the first member angularly displaces about the rotation axis.

5. The bearing assembly as recited in claim 3 wherein:
the clutch first portion includes an annular body having first and second axial ends and a plurality of teeth extending axially from the first end and spaced circumferentially about the centerline so as to define a separate one of a plurality of recesses between each pair of adjacent teeth, the annular body second end being connected with the outer end of the bearing;
the clutch second portion includes an annular body having first and second axial ends and a plurality of teeth extending axially from the first end and spaced circumferentially about the centerline so as to define a separate one of a plurality of recesses between each pair of adjacent teeth, the second end of the second portion annular body being connected with the first member, each one of the first portion teeth being disposable within a separate one of the second portion recesses and each one of the second portion teeth being disposable within a separate one of the first body recesses when the clutch first and second portions are engaged; and
the biasing member includes a disk spring disposed between the clutch first and second portions and configured to bias each one of the clutch first and second portions away from the other one of the clutch first and second portions when the first member is non-rotational about the rotation axis.

6. The bearing assembly as recited in claim 1 wherein the bearing inner axial end is located a first distance from the rotation axis and the bearing outer axial end is located a second, greater distance from the rotation axis.

7. The bearing assembly as recited in claim 1 wherein the bearing inner end is angularly displaceable about the centerline with respect to the bearing outer end when the second member angularly displaces about the centerline.

8. The bearing assembly as recited in claim 7 wherein at least a portion of the laminated bearing is deflectable about the other axis when the second member angularly displaces about the other axis.

9. The bearing assembly as recited in claim 7 wherein the laminated bearing includes a plurality of alternating flexible laminae and rigid laminae bonded together and spaced along the first member centerline, the laminated bearing being configured such that each one of the flexible laminae torsionally deforms to angularly displace the bearing inner end with respect to the bearing outer end when the second member angularly displaces about the first member centerline.

10. The bearing assembly as recited in claim 9 wherein each one of at least a portion of the flexible laminae includes a flat layer of an elastomeric material with a central opening and each one of at least a portion of the rigid laminae is formed as a flat annular plate with a central opening.

11. The bearing assembly as recited in claim 1 wherein at least a portion of the bearing includes a plurality of alternating partially spherical flexible laminae and partially spherical rigid laminae bonded together and spaced along the centerline, the bearing portion being configured to deflect about the other axis when the second member angularly displaces about the other axis.

12. The bearing assembly as recited in claim 11 wherein the bearing portion is a bearing first portion and the bearing further includes a bearing second portion spaced axially from the bearing first portion and including a plurality of alternating flexible laminae and rigid laminae bonded together and spaced along the first member centerline, each one of the rigid laminae of the bearing second portion include a flat annular plate with a central opening and each one of the flexible laminae of the bearing second portion including a flat layer of an elastomeric material with a central opening.

13. The bearing assembly as recited in claim 12 further comprising:
an inner member providing the bearing inner end and including an inner axial end with a flat surface connected with the second member and an outer axial end with a partially spherical surface, an innermost flexible lamina of the bearing first portion being bonded to the inner member partially spherical surface; and
a transition member having an inner axial end with a partially spherical concave surface, an outermost flexible lamina of the first bearing portion being bonded to the transition member concave surface, and an outer axial end having a flat radial surface, an innermost flexible lamina of the bearing second portion being bonded to the transition member flat surface.

14. A rotor assembly for a rotorcraft, the rotor assembly comprising:
a mast rotatable about a central axis;
a spindle having an inner radial end coupled with the mast, an opposing outer radial end and a centerline extending between the inner and outer ends;
an elongated rotor blade extending perpendicular to the central axis; and
a bearing assembly for movably coupling the blade with the spindle and including:
a laminated bearing with a central bore for receiving a portion of the spindle and having an inner axial end coupled with the blade and an outer axial end spaced from the inner axial end along the spindle centerline and being coupleable with the spindle; and a clutch mechanism configured to releasably couple the outer axial end of the bearing with the spindle when the spindle angularly displaces about the mast central axis.

15. The rotor assembly as recited in claim 14 wherein the clutch mechanism includes a first portion connected with the outer axial end of the laminated bearing, a second portion coupled with the spindle, the clutch first and second portions being engageable to releasably couple the blade with the spindle, and a biasing member configured to space apart the first and second clutch portions when the spindle is non-rotational about the central axis.

16. The rotor assembly as recited in claim 15 wherein the laminated bearing is movably disposed about the at least one spindle such that centrifugal force displaces the bearing and the first clutch portion radially outwardly along the spindle centerline and deflects the biasing member so that the clutch first portion engages with the clutch second portion when the first member angularly displaces about the central axis.

17. The rotor assembly as recited in claim 15 wherein:
the clutch first portion includes an annular body having first and second axial ends and a plurality of teeth extending axially from the first end and spaced circumferentially about the centerline so as to define a separate one of a plurality of recesses between each pair of adjacent teeth, the annular body second end being connected with the outer end of the bearing;
the clutch second portion includes an annular body having first and second axial ends and a plurality of teeth extending axially from the first end and spaced circumferentially about the centerline so as to define a separate one of a plurality of recesses between each pair of adjacent teeth, the second end of the second portion annular body being connected with the first member, each one of the first portion teeth being disposable within a separate one of the second portion recesses and each one of the second portion teeth being disposable within a separate one of the first portion recesses when the clutch first and second portions are engaged; and
the biasing member includes a disk spring disposed between the clutch first and second portions and configured to bias each one of the clutch first and second portions away from the other one of the clutch first and second portions when the spindle is non-rotational about the central axis.

18. The rotor assembly as recited in claim 14 wherein:
the bearing inner end is angularly displaceable about the centerline with respect to the bearing outer end when the blade angularly displaces about the centerline; and
at least a portion of the laminated bearing is deflectable about the other axis when the blade angularly displaces about the other axis.

19. The bearing assembly as recited in claim 14 wherein the laminated bearing includes a plurality of alternating flexible laminae and rigid laminae bonded together and spaced along the first member centerline, the laminated bearing being configured such that each one of the flexible laminae torsionally deforms to angularly displace the bearing inner end with respect to the bearing outer end when the blade angularly displaces about the spindle centerline.

20. A bearing assembly for movably coupling a first member and a second member, the first member having a centerline and being angularly displaceable about a rotation axis at least generally perpendicular to the centerline, the second member being angularly displaceable about at least one of the centerline and another axis perpendicular to the centerline, the bearing assembly comprising:
a laminated bearing with a central bore for receiving a portion of the first member and having an inner axial end coupled with the second member and an outer axial end spaced from the inner axial end along the first member centerline and being coupleable with the first member; and
a clutch mechanism having a first portion connected with the outer axial end of the laminated bearing, a second portion coupled with the first member, the clutch first and second portions being engageable to releasably couple the second member with the first member, and a biasing member configured to space apart the first and second clutch portions when the first member is non-rotational about the rotation axis.

* * * * *